United States Patent
Delany

(10) Patent No.: US 9,948,706 B2
(45) Date of Patent: Apr. 17, 2018

(54) PREEMPTIVE ADDRESS MAPPING FOR SERVER LOAD BALANCING

(71) Applicant: Apple Inc., Cupertino, CA (US)

(72) Inventor: Mark Delany, San Jose, CA (US)

(73) Assignee: Apple Inc., Cupertino, CA (US)

( * ) Notice: Subject to any disclaimer, the term of this patent is extended or adjusted under 35 U.S.C. 154(b) by 172 days.

(21) Appl. No.: 14/928,955

(22) Filed: Oct. 30, 2015

(65) Prior Publication Data
US 2016/0359958 A1    Dec. 8, 2016

Related U.S. Application Data

(60) Provisional application No. 62/170,084, filed on Jun. 2, 2015.

(51) Int. Cl.
| | |
|---|---|
| *G06F 15/173* | (2006.01) |
| *H04L 29/08* | (2006.01) |
| *H04L 29/12* | (2006.01) |

(52) U.S. Cl.
CPC ........ *H04L 67/101* (2013.01); *H04L 61/1511* (2013.01); *H04L 67/1097* (2013.01); *H04L 61/2007* (2013.01)

(58) Field of Classification Search
CPC ............... H04L 67/101; H04L 61/1511; H04L 67/1097; H04L 61/2007
See application file for complete search history.

(56) References Cited

U.S. PATENT DOCUMENTS

| | | | | |
|---|---|---|---|---|
| 8,194,628 | B2 * | 6/2012 | Ku | H04L 29/1216 370/338 |
| 8,260,914 | B1 * | 9/2012 | Ranjan | H04L 61/1511 709/224 |
| 2007/0033645 | A1 * | 2/2007 | Jones | H04L 29/12009 726/12 |
| 2011/0153807 | A1 * | 6/2011 | Vicisano | H04L 29/12066 709/224 |
| 2012/0284372 | A1 * | 11/2012 | Ghosh | H04L 61/1511 709/219 |
| 2012/0317268 | A1 * | 12/2012 | Akhtar | H04L 29/12311 709/224 |

\* cited by examiner

*Primary Examiner* — Brian Whipple
(74) *Attorney, Agent, or Firm* — Womble Bond Dickinson (US) LLP

(57) ABSTRACT

A method and an apparatus for global server load balancing are described. Attributes of a set of network addresses may be maintained. Each network address may be assignable to a device capable of accessing a service via a domain name. A set of servers may be provided for hosting the service of the domain name. A mapping relationship between the network addresses and a set of preferences among the servers may be determined based on the attributes. Multiple network addresses may share a common preference. An association data may be generated to represent the mapping relationship. Multiple network addresses may be collectively represented in the association data to be associated with a common preference. A device can reach one of the servers according to the association data in real time asynchronous to when the association data is generated.

24 Claims, 7 Drawing Sheets

600

Loading, at a domain name server, an association data into a memory of the server, the association data mapping each of a set of network addresses to one of a set of preferences for a set of domain server addresses to provide a service of a domain name, each preference indicating an ordered choices of one or more of the domain server addresses, wherein the association data includes multiple associations, each association mapping one or more of the network addresses to one of the preferences
601

Querying, in response to receiving a name resolution request for the domain name from a client of a particular network address, the association data for a particular association matching the particular network address, wherein the particular association maps the particular network address to a particular one of the preferences
603

Sending the particular one preference to the client for providing the service of the domain name to the client via one or more of the domain server addresses specified in the particular one preference
605

Fig. 6

PREEMPTIVE ADDRESS MAPPING FOR SERVER LOAD BALANCING

CROSS-REFERENCE TO RELATED APPLICATIONS

This application is related to, and claims the benefits of, U.S. Provisional Patent Application No. 62/170,084, filed on Jun. 2, 2015 entitled "PREEMPTIVE ADDRESS MAPPING FOR SERVER LOAD BALANCING", Mark Delany, which is hereby incorporated by reference herein in its entirety.

FIELD OF INVENTION

The present invention relates generally to load balancing.

BACKGROUND

To provide a scalable service or application of a domain name, multiple host servers stationed in different geographical regions are typically employed to serve client requests from different parts of the world. Client requests are usually initiated under a symbolic host name to a DNS (domain name system) server for returning one or more IP (internet protocol) addresses, each corresponding to an address at which one of the hosting servers can be reached. To implement the scalability of service, the DNS server may need to support some load sharing among the host servers.

For example, a DNS server can apply a simple round-robin algorithm to rotate the IP addresses in a list of responsive IP addresses, so as to distribute equally the requests for access among the host servers. However, the simple rotation may fail to take into considerations aspects associated with the client and server, such as the host servers' locations relative to the client.

Therefore, traditional global load balancing via domain name resolution may not be scalable for a large number of client devices and multiple attributes.

SUMMARY OF THE DESCRIPTION

Global server load balancing can be performed preemptively based on attributes associated with possible client network addresses, such as IP addresses. Redirection decisions on mapping possible client network addresses to one or more of a set of available servers can be determined preemptively or pre-computed based on associated attributes of the network address and a load balancing policy among the servers.

Most attributes of clients and/or network addresses and/or the load balancing policy vary at a far slower pace than the amount of time required to prepare an exhaustive set of redirection answers for possible client network addresses. A simple lookup table or database configured with the predetermined redirection answers can allow a client device to be directed to a proper server via a simple and fast query operation during runtime.

In one embodiment, attributes for a set of network addresses may be maintained. Each network address may be assignable to a device capable of accessing a service via a domain name. A set of servers with different server addresses may be provided for hosting the service of the domain name. A mapping relationship between the network addresses and a set of preferences among the servers may be determined based on the attributes. The mapping relationship may specify one or more preferences for each network address. Multiple network addresses may share a common preference. An association data may be generated to represent the mapping relationship. Multiple network addresses may be collectively represented in the association data to be associated with a common preference. A device assigned with one of the network addresses can request the service via one of the servers according to a corresponding preference specified in the association data in real time asynchronous to when the association data is generated.

In another embodiment, an association data may be loaded into a memory of a domain name server. The association data can map each one a set of client identifiers to one of a set of preferences. Each preference can specify an ordered choice of at least one of a set of hosting servers to receive a service associated with a domain name. The association data can include multiple associations, each association mapping one or more of the client identifiers to one of the preferences. The association data may be queried for a particular association using a client identifier of a client device in response to receiving a name resolution request from the client device. An association matching the client identifier may be identified from the association data to provide a preference for host server selection. The preference identified may be sent to the client for the client to reach the selected server for receiving a service of the domain name.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 6 is a flow diagram illustrating one embodiment of a process to perform a name resolution service using a pre-built server selection map for global load balancing;

DETAILED DESCRIPTION

Figure 1:
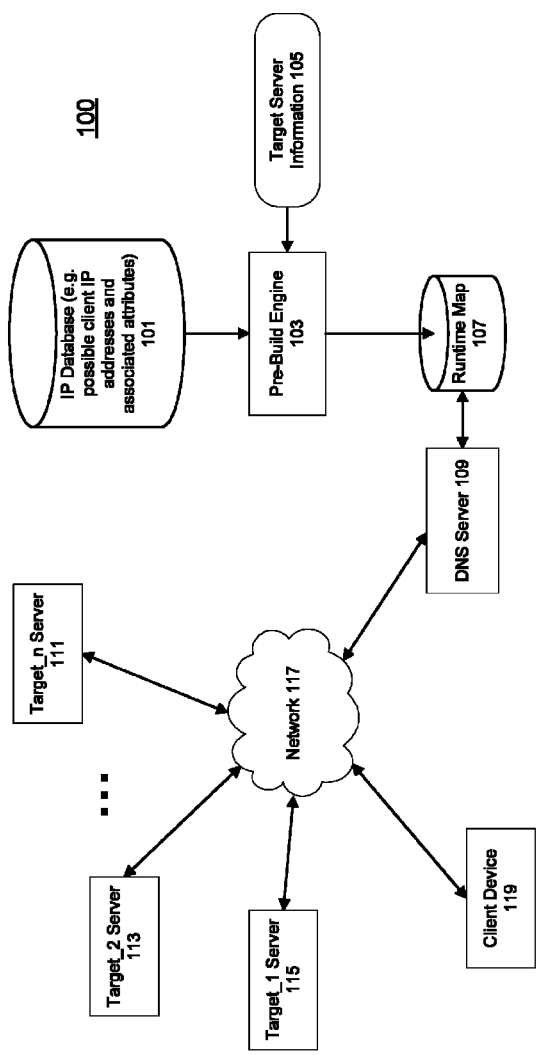
FIG. 1 is a block diagram illustrating one embodiment of global load balancing based on preemptively determined server selection.

Methods and apparatuses for pre-computed address mapping for global server load balancing are described herein. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

In one embodiment, pre-computed or offline computed answers to load balancing multiple available servers providing a network service (e.g. domain name resolution service) for client requests from possible client addresses can be leveraged to speed up service performance in real time. For example, the number of possible client addresses (e.g. in billions) can be significantly larger (e.g. with multiple orders of magnitude) than a finite number (e.g. in hundreds) of available servers. The pre-computed answers can be represented compactly and organized efficiently in a mapping data for fast query during runtime.

In one embodiment, multiple client network addresses may be mapped into one preference (or one answer) for server selection. These client network addresses may be collectively represented, collapsed or combined with a single representation of the mapping from these client network addresses to a common server selection in the mapping data to allow efficient query/search. In some embodiments, these client network addresses may correspond to contiguous number representations of network addresses or a range of network addresses corresponding to a single entry in a lookup table in the mapping data.

According to a certain embodiment, the preemptive computation can be invoked to evaluate every server mapping answer for each possible client network address according to a configured schedule independent of actual client requests. The evaluation may be based on attributes associated with the client network addresses. Values of these attributes may vary over time with a rate of changes slower than a frequency of the preemptive computations specified in the scheduled.

Comparison between different servers may be performed in a preemptive manner based on attributes associated with client network addresses and server attributes for preselecting one or more of the servers to provide a network service to a device assigned with one of the network addresses. Exemplary attributes of a network address may include geo-location information (e.g. longitude/latitude coordinates, city code, country code, etc.), characteristics of the underlying network infrastructures (e.g. service provider identifier, bandwidth control mechanisms, available bandwidth, etc.), technologies (e.g. cable or digital subscriber line), or other application information. These attributes (e.g. types, total number, possible attribute values etc.) may be expandable to accommodate updates/changes to allow pre-computation or pre-decision on how server load should be balanced.

Each server may be characterized by server attributes indicating, for example, locations, available capacities (e.g. currently available bandwidth), or other applicable server attributes. Determining a preference of server selection may be based on configured rules, policies, constraints, criteria or other applicable selection mechanism.

For example, the attributes of client network addresses may include geo-location related information indicating approximately where a client device of a network address may be located. The network address may be mapped to a server selected to provide a network service based on geographical proximity (e.g. closest distance) between a device assigned with this network address and the server.

Multiple considerations may be combined to determine a preferred selection of servers to provide a network service for a client network address. In addition to geographical proximity consideration, a policy may be applied to impose rules, constraints, criteria or other applicable regulations on the server selection. For example, a policy may indicate that client devices assigned with certain network addresses may not receive service from a particular server, regardless how closely located geographically between this particular server and these client devices. Updates in the policy may invoke a new round of the preemptive computation to allow synchronization of the mapping data with the policy.

A range of multiple client network addresses (e.g. IP address) assignable (e.g. pre-allocated) for client devices located within a network connection range of a campus or area may be associated with common geo-location related attributes based on the fixed location of the campus. Although network enabled client devices in this campus may be assigned with different client network address, these client devices may receive the same answer on preferred server(s) for a name resolution request (or other applicable network service request) based on the geo-location related information of the attributes associated with the network addresses.

Attributes of a network address may include time varying characteristics. For example, static attributes, such as city code, country code, etc. may change rarely or infrequently (e.g. weekly, monthly, yearly etc.). Dynamic attributes, such as GPS (global positioning system), cellular locations (e.g. from cellular towers) or other applicable real time attributes associated with a device of the network address may change (e.g. nearly) continuously. In one embodiment, pre-emptive computation of load balancing answers can be performed based on the static attributes (or other selected attributes) of the network address with a frequency (e.g. daily) higher than how often the static attributes are updated. Dynamic attributes may be evaluated together with the pre-computed (or previously evaluated) answers (or default answer) in real time in response to a client request.

Multiple attributes of network addresses may be considered together (e.g. in one invocation) in the pre-computation to collapse a large number of possible combinations of attribute values into a small number of tractable answers of server selections. For example, the pre-computed mapping data can include this small number of answers, each mapped with multiple ones of this large number of possible combinations of attribute values. Each combination of attribute values may include a network address, attribute values associated with the network address and/or dynamic attribute values (e.g. run-time information) associated with a device assigned with the network address, or other applicable attribute values. Run-time information corresponding to additional variations of attribute combinations associated with a network address may be collapsed into these answers in the pre-computed mapping data.

In one embodiment, pre-computed load balancing answers or preemptive address mapping can be supported with a single infrastructure independent of amount of load balancing requests in real time. For example, a preemptive computation engine can be provided via a high performance server or clusters of servers to generate the mapping data periodically. The mapping data or a pre-computed table can be distributed or pushed to network edges (e.g. DNS servers) to allow simple table lookup operations to identify target servers for traffic directions. Scaling of the network edges (e.g. increase of the number of DNS servers) may be achievable with one single infrastructure for preemptive computation.

Additionally, updates on redirection policy and/or attributes of network addresses can be easily accommodated within the infrastructure where the preemptive computation operations are performed without affecting real time network traffic redirections using a previously computed address mapping data. Further, the infrastructure may not be exposed or open for public access. The mapping data exposed at the network edges may not include any sensitive policy related code, license or other risky information hosted within the infrastructure insulated from security attacks.

The embodiment described herein can provide an extensible system to allow changes to how DNS lookup table are created, because the attributes, and how the attributes are processed, can be changed prior to generating a new lookup table that has the mapping. Thus, attributes can be added or removed and then a new lookup can be generated using the revised attributes.

FIG. 1 is a block diagram illustrating one embodiment of global load balancing based on preemptively determined server selection. For example, multiple servers, such as target_1 server 111, target_2 server 113, . . . target_n server 115, may be globally stationed in a load balanced manner to provide data service of a named domain (e.g. "www.apple.com"). Network addresses of available target servers, such as target servers 111, 113 . . . 115, and associate server attributes may be maintained in target server information store 105.

Client device 119 may be coupled with target servers 111, 113, 115 via network 117 to allow access to the data service. Network 117 may include any type of networks such as a local area network (LAN), a wide area network (WAN) such as the Internet, a fiber network, a storage network, or a combination thereof, wired or wireless. In one embodiment, client device 119 may be identified by a client network address in network 117. The client network address may be statically or dynamically assigned to client device 119. The client network address may be one of possible client network addresses and associated attributes stored in IP database 101.

Client device 119 may send a name resolution request for accessing the data service provided by the named domain of target servers 111 . . . 115 to DNS (domain name system) 109, for example, via network 117. In response, DNS server may identify which target server(s) 111, 113 . . . 115 to provide the data service of the named domain. For example, each target server 111, 113, . . . 115 may have a different server network address. Client device 119 may receive a preference response from DNS server 109 for a name resolution request. The preference response may include an ordered list of server network addresses of one or more target servers 111, 113 . . . 115 for client device 119 to direct a subsequent request for the data service of the named domain.

In one embodiment, DNS server 109 may perform name resolution operation via runtime map 107. For example, runtime map 107 may be a simple lookup table loaded in a memory of DNS server 109. Alternatively, runtime map 107 may include a simple database including pre-computed answers for name resolution requests. Preferences of target servers may be have already been identified and sorted or arranged in the database according to client network addresses for ease of query. DNS server 109 can perform a query or simple lookup based on the network address of client device 119 to retrieve a previously generated preference on target server selection from runtime map 107.

In certain embodiments, DNS server 109 may include components, such as a software plugin, capable of retrieving dynamic attributes of client device 119 in response to receiving a name resolution request from client device 119. The dynamic attributes may indicate, for example, where client device 119 was located in the latest period of time (e.g. 1 hour) or other continuously changing attributes. DNS server 109 can generate a name resolution response for client device 119 based on both a static (or less frequently changing) aspect and a dynamic aspect of client device 119. For example, the static aspect may be related to a prepared name resolution answer retrieved from runtime map 107 via the network address of client device 119. The dynamic aspect may be related to dynamic attributes of client device 119 identified from the name resolution request received from client device 119.

In one embodiment, pre-build engine 103 may be invoked to evaluate target server preferences exhaustively for each possible client network address in IP database 101. Pre-build engine 103 may perform preemptive computation to map possible client network addresses to target server preferences according to a load balancing policy. Pre-build engine 103 may prepare or pre-compute load balancing answers which may be an approximate or sub-optimal (compared with results of real time evaluation). The prepared answer may be stored in runtime map 107 indexed according to client network addresses or collective representation of client network addresses.

Pre-build engine 103 may be invoked asynchronously to, for example, name resolutions requests received at DNS server 109. In some embodiments, pre-build engine 103 may be invoked periodically, according to a configured schedule or on demand when changes or updates occur on attributes in IP database 101 and/or adopted load balancing policy.

Figure 2:
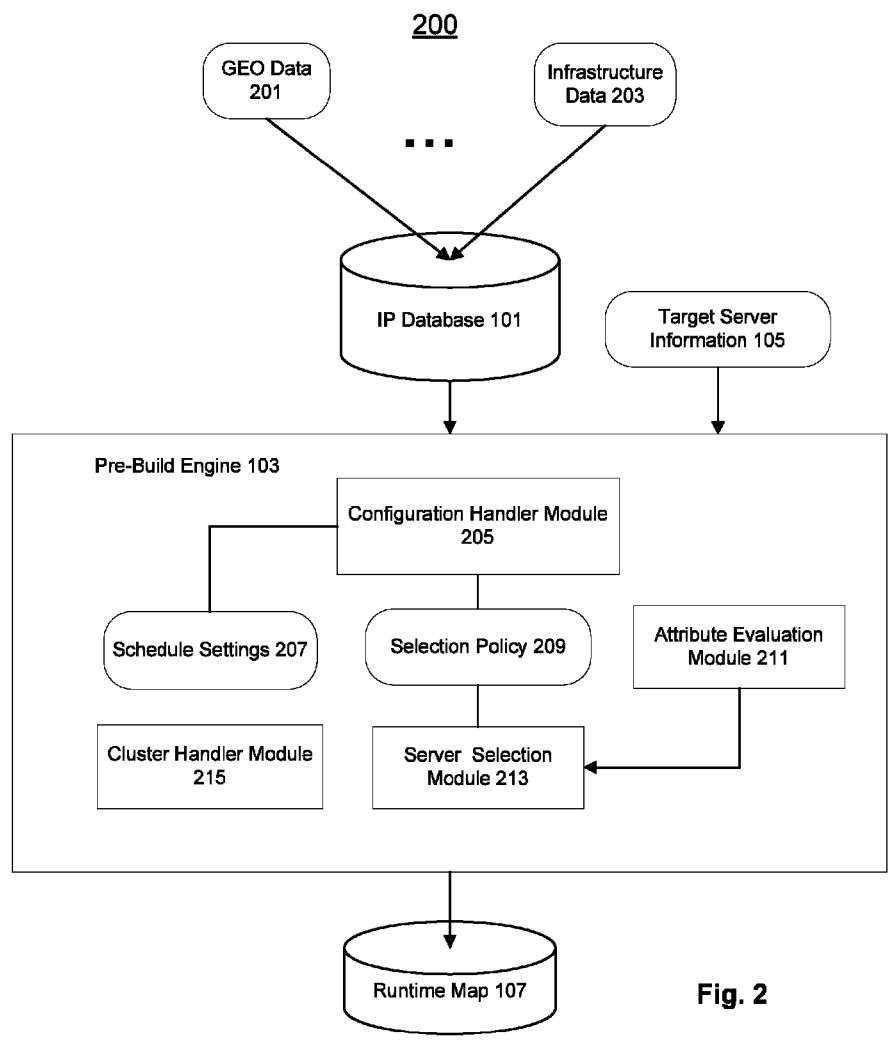
FIG. 2 is a block diagram illustrating one embodiment of preemptively selecting target servers for possible clients.

FIG. 2 is a block diagram illustrating one embodiment of preemptively selecting target servers for possible clients. For example, system 100 of FIG. 1 may include some components of system 200 of FIG. 2. Pre-build engine 103 may be hosted in one or more operating environments (or systems) in one or more server devices in system 200. In one embodiment, pre-build engine 103 can regenerate runtime map 107 in an on-going basis using latest attributes of client network addresses in IP database 101 and latest attributes of available target servers in target server information 105.

For example, pre-build engine 103 may be invoked periodically or manually via schedule settings 207 to pre-compute preferred mappings from client network addresses to available target server addresses based on server selection policy 209. Schedule settings 207 and server selection policy 209 may be updated via configuration handler module 205.

In one embodiment, schedule settings 207 can specify periodic (e.g. daily, hourly etc.) rebuilds and/or event-triggered rebuilds of runtime map 107. Selection policy 209 can include rules, constraints, algorithms, criteria or other applicable computation specifications for client server address mapping.

For example, attribute evaluation module 211 can retrieve network address attributes from IP database 101 and target server information 105 to calculate geological distance, network latency distance, transmission costs, and or other applicable characteristics between a client network address and each target server.

Server selection module 213 can compare possible server selections for each client network address according to results of attribute calculations of attribute evaluation module 211 and policy settings of selection policy 209. For example, server selection module 213 may filter out possible target servers (or add possible target servers) for a specific IP address according to a constraint specific in selection policy 209, for example, due to legal requirements, requests, imposed rules, such as net neutrality rules or behaviors based on net neutrality rules, etc. Server selection module can rank filtered servers according to, for example, network routing costs as evaluated to generate a preference selection as an ordered list of recommended target servers for the specific IP address.

In some embodiments, cluster handle module 215 may collapse or generate a compact representation (e.g. a single entry to a database) representing a common preference for a range of client network addresses in runtime map 107. For example, a range of IP addresses 17.0.0.0-17.255.255.255 may share a common server selection preference and represented collectively via a single entry representing the range 17.*.*.* in runtime map 107. The single entry can allow a fast query against runtime map 107 for each client IP address within the range 17.*.*.* without a need of iteration within the range of IP addresses.

Attributes of network addresses in IP database 101, such as geological information in GEO data 201, information on underlying network infrastructure supporting the associated network address in infrastructure data 203, etc. may be obtained from third party vendor(s). IP database 101 may be kept up to date based on a subscription relationship with third party network service sources.

Figure 3:
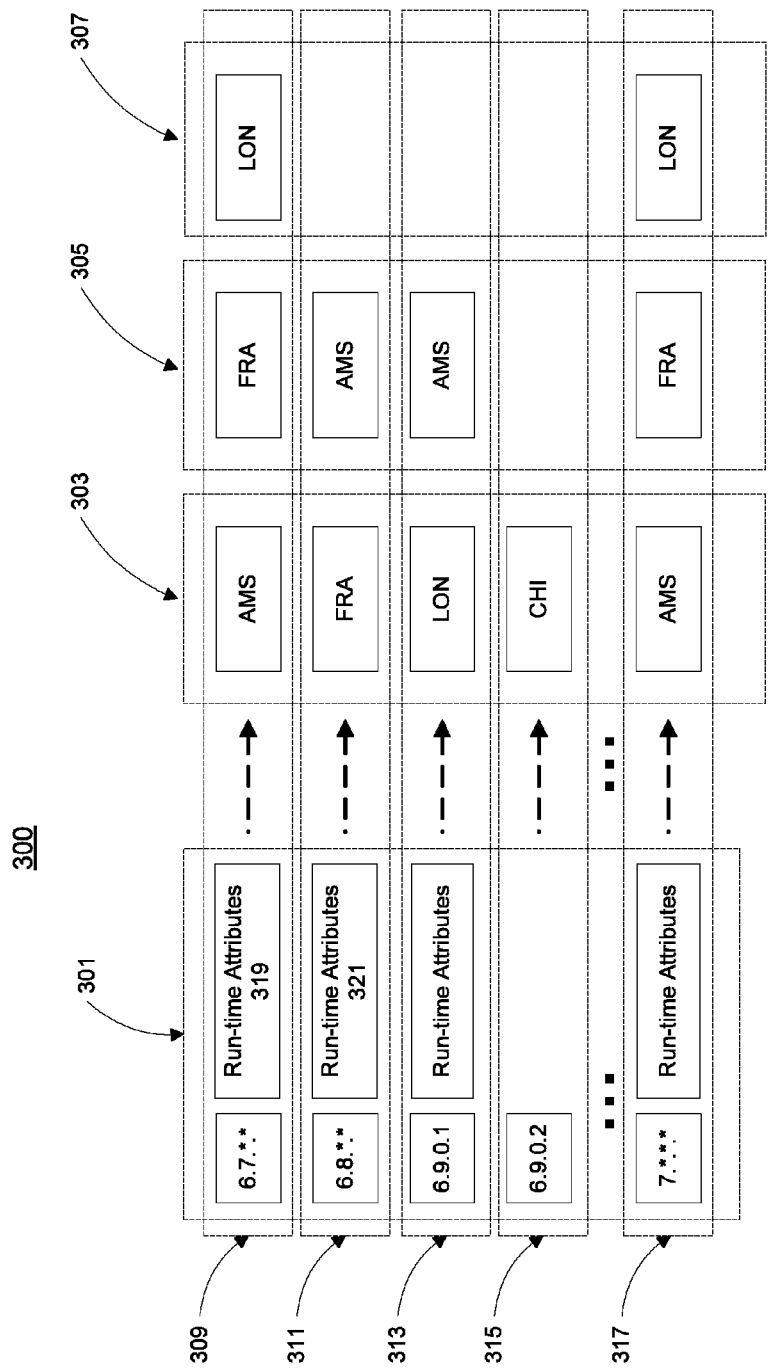
FIG. 3 illustrates one example of predetermined server selections for possible client addresses according to one embodiment of the present invention.

FIG. 3 illustrates one example of predetermined server selections for possible client addresses according to one embodiment of the present invention. Example 300 may indicate mapping from client identifiers (e.g. device run-time identifiers) to preferences of server selections represented in, for example, runtime map 107 of FIG. 1.

Client identifiers including client IP addresses may be compactly represented collectively as indicated in column 301. Each row 309, . . . 317, may correspond to a mapping from a group of one or more client identifiers, such as client IP addresses and/or optional run-time attributes, to a server selection preference. Each server selection preference may include a number of ordered server preference, such as first preference 303, second preference 305, third preference 307, etc. The number of server preferences may vary between different mappings.

For example, client identifiers in row 309 may include a range of client IP addresses "6.7.0.0-6.7.255.255" collectively represented as "6.7.*.*". Run-time attributes 319 may specify values of run-time attributes of a client device. Run-time attributes of different compactly represented client identifiers may be different or the same. For example, run-time attributes 321 of row 311 and run-time attributes 319 of row 309 may include different sets of run-time attributes.

A client device having run-time attributes matching run-time attributes 319 (e.g. of the same device type) and assigned with an IP address within the range "6.7.0.0-6.7.255.255" can be mapped to three server preferences indicated as AMS, FRA, LON in row 309, each representing one of available target servers. A client device assigned with an IP address 6.9.0.2 regardless which run-time attributes associated with this client device may be mapped to a specific target server CHI in row 315 as a result of, for example, a specific selection policy. The maximum number of server preferences for each row may correspond to the number of available servers.

Figure 4:
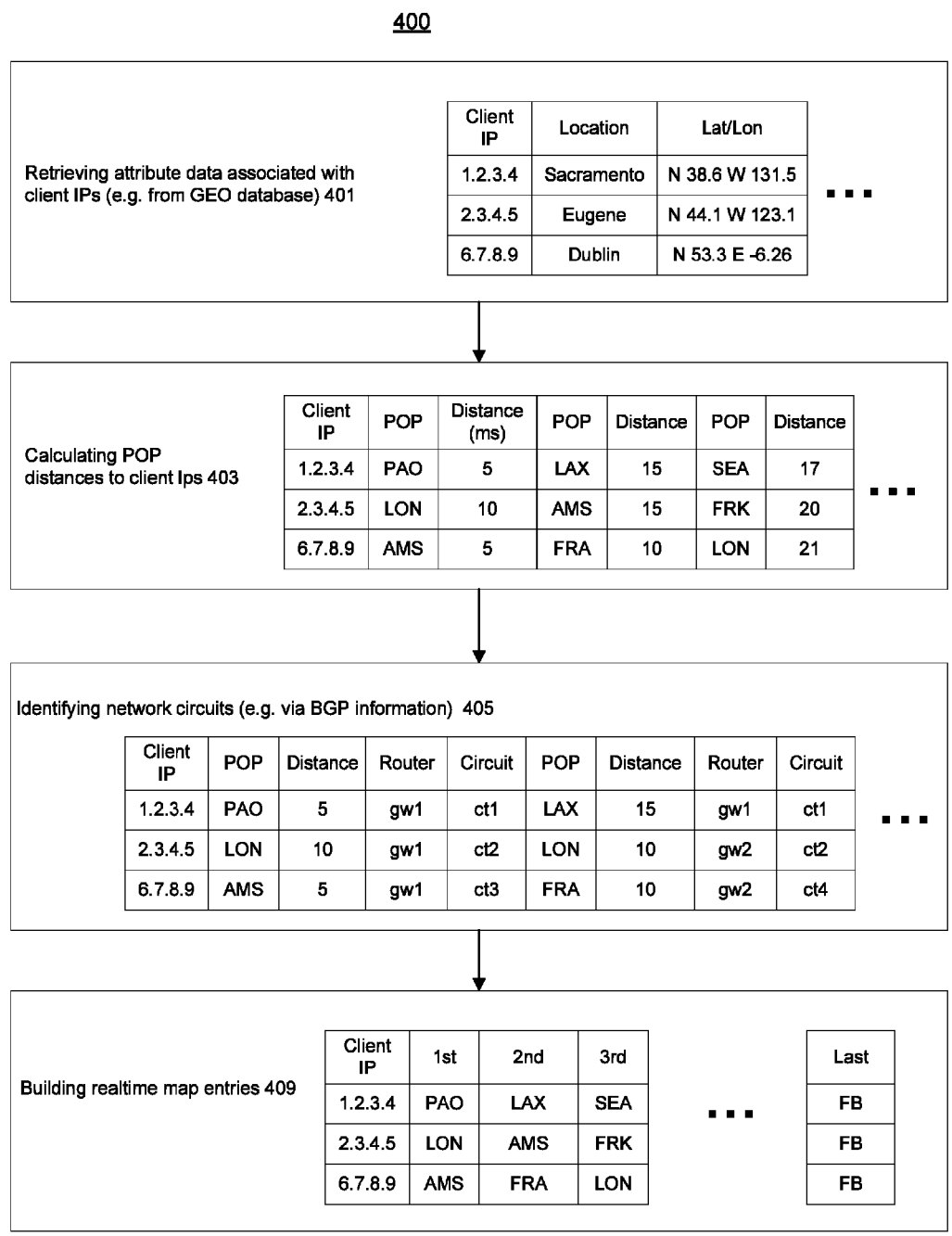
FIG. 4 is a sequence diagram illustrating exemplary steps to pre-build a server selection map based on attributes of client addresses.

FIG. 4 is a sequence diagram illustrating exemplary steps to pre-build a server selection map based on attributes of client addresses. For example, sequence 400 may be performed by some components of system 200 of FIG. 2. At step 401, geophysical related attributes (e.g. attribute data or attribute values) of possible client network addresses may be retrieved from, for example, GEO data 201 via IP database 101 of FIG. 2. For example, client IP address 2345 may be associated with latitude/longitude coordinates "N 44.1 W 123.1" located in Eugene.

At step 403, distances between client network addresses and available target servers or POP (point of presence) servers may be calculated, for example, via attribute evaluation module 211 of FIG. 2. In one embodiment, a distance between a client network address and a server network address may be measured in terms of latency time (e.g. in milliseconds or other applicable time units). As illustrated, the attributes related to geophysical locations and/or network connection configurations indicated a distance of 5 ms between client IP address "2.3.4.5" and target server identified by "PAO".

At step 405, network circuits may be identified between client IP addresses and available target servers, for example, via attribute evaluation module 211 of FIG. 2. A network circuit may include BGP (border gateway protocol) information related to network infrastructures such as network gateway hosts. For example, network circuits between client IP address 1.2.3.4 and target server PAO may be identified to include a router "gw1" provided by network circuit (e.g. provider identifier "ct1".

At step 409, entries of real time mapping data, such as runtime map 107 of FIG. 2, may be created/updated, for example, via server selection module 213 of FIG. 2. To illustrate, client IP address 1.2.3.4 may be mapped or pre-assigned a selection preference including target server PAO, LAX, SEA . . . FB in ranked order. When receiving a name resolution request from a client device with network address 1.2.3.4 (in the future), a server selection preference listing PAO, LAX, SEA . . . FB may be sent back in response. The client device can request service via the first preferred server PAO accordingly. In the event that PAO fails to deliver the service, the client device may make a subsequent attempt to request the service from LAX accordingly. The server preference list may include a lastly ranked option FB representing a fallback server among the available target server.

Figure 5:
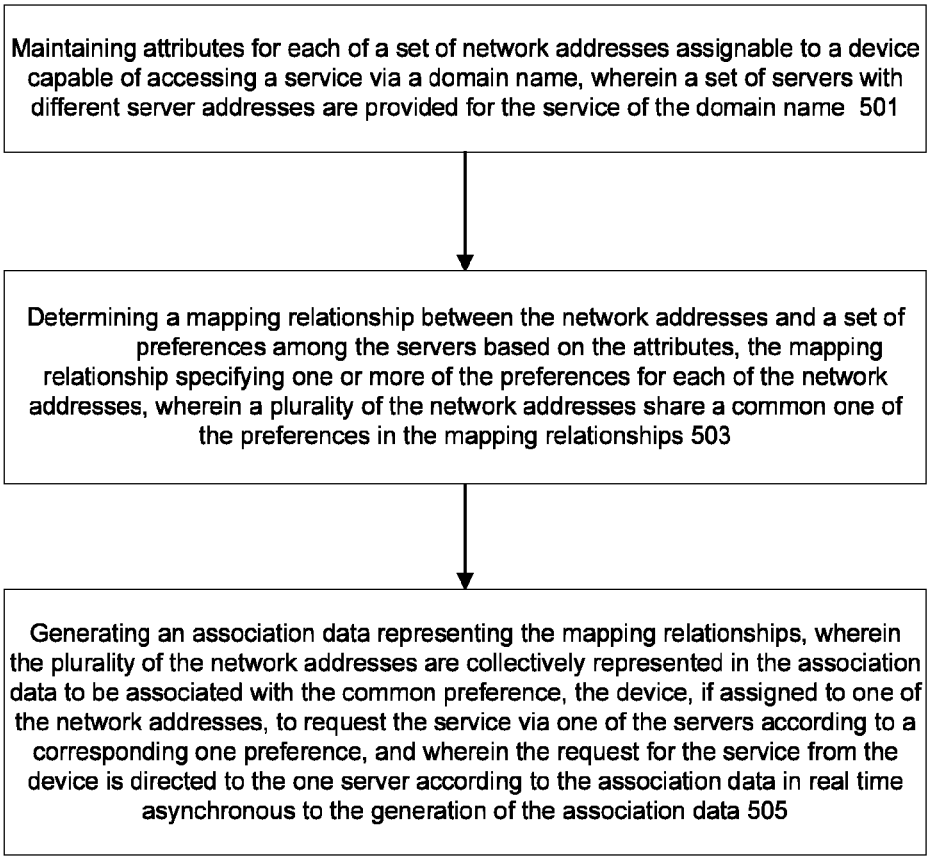
FIG. 5 is a flow diagram illustrating one embodiment of a process to pre-build a server selection map.

FIG. 5 is a flow diagram illustrating one embodiment of a process to pre-build a server selection. Exemplary process 500 may be performed by a processing logic, including, for example, some components of system 200 of FIG. 2 or system 300 of FIG. 3. At block 501, the processing logic of process 500 can maintain attributes for each of a plurality of network addresses assignable to a client device capable of accessing a service via a domain name, such as a web server of this domain name.

These network addresses may be provided or supported via a variety of network infrastructure providers. The number or scope of these assignable client network addresses may vary over time. The service of this domain name may be provided via any one of a plurality of possible target servers with different server addresses to allow, for example, balanced load among these target servers. The attributes characterizing a network address may be extendable and specified a priori independent of whether the network address has been assigned to a client device.

At block 503, the processing logic of process 500 can determine a mapping relationship between the network addresses and a set of preferences among the servers based on the attributes. The mapping relationship may specify one or more of the preferences for each of the network address. A group of network addresses can share a common preference in the mapping relationships.

According to certain embodiments, a portion of the attributes may include run-time attributes. A client device may be identified by a client identifier including a network address and the run-time attributes (e.g. attribute values of the run-time attributes) associated with a client device assigned with the network address. An attribute value of a run-time attribute associated with a network address may not be known in advance. For example, a type of client device (e.g. a run-time attribute) associated with a network address may not be known until after a client device of a specific type is actually assigned with the network address. The mapping relationship can specify one or no more than one of the preferences for each client identifier.

In one embodiment, a preference can include an ordered list of IP addresses of one or more of the servers. A client device may receive the ordered list in response to, for example, a name resolution request, for requesting a service. According to the ordered list, one of the servers may be selected for the device to send the request for the service. The number of possible preferences for the mapping relationship may be limited by about a factorial of the number of the set of available servers (or target servers).

Service loads among the set of servers may be distributed (e.g. balanced) according to a policy configured with rules, conditions, constraints, or other applicable considerations. The processing logic of process 500 can determine the mapping relationships according the configured policy. For example, each possible server may be associated with server properties (or attributes). The processing logic of process 500 can evaluate attributes of client network addresses with the server properties according to the rules and conditions of the policy. In some embodiments, the policy may be updated on demand as needed. The processing logic of process 500 may renew the mapping relationship when the policy is updated.

In one embodiment, attributes of a client network address may be employed to identify a client location (or geophysical location) which may represent an approximate actual physical location of a client device assigned with the corresponding network addresses. Server properties of each available target server may include a server location. The processing logic of process 500 may compare distances of the client location and the server location to evaluate the attributes for the mapping relationship.

For example, a preference mapped by a network address may be specified with a list of target servers ranked according to degrees of proximities (e.g. the closer the proximity, the higher the ranking) according to the distances compared to allow balanced loads of the target servers. The distances may be based on differences of geological locations of the client location and the server locations indicated in the attributes of client and server network addresses.

In some embodiment, attributes of a client network address may indicate a network service provider of the corresponding network address. A service provided by domain may be supported by a domain network infrastructure (e.g. network topology, configurations, settings, hardware identifiers, etc.). The network service provider can have a provider network infrastructure. The attributes of the client network address may also indicate a client network location identified within the provider network infrastructure. Network locations of the available servers may be identified (or located) within the domain network infrastructure. The processing logic of process 500 may compare the distances between the client and server network addresses based on differences of the network locations, for example, measured in time unit indicating an amount of network connection latency.

The processing logic of process 500 may determine the mapping relationship repetitively based on a schedule which may be preconfigured. In one embodiment, the schedule can indicate that the mapping relationship is updated with occurrences of changes of an associated load balancing policy.

Alternatively or optionally, the schedule may specify a regular frequency to update the mapping relationship (e.g. daily or weekly etc.). In one embodiment, attributes of possible network addresses may be updated from time to time. For example, the attributes may be provided by network address provider sources. The processing logic of process 500 can refresh (or retrieve) the attributes of network addresses from the provider sources periodically as specified by the provided sources. The attributes may be updated less frequently than the mapping relationship to ensure changes of the attributes are reflected on the mapping relationship in a timely manner.

At block 503, the processing logic of process 500 can generate an association data representing the mapping relationships determined. The number of assignable network addresses (e.g. in the billions) may be significantly larger than the number of possible preferences (e.g. in the hundreds). In one embodiment, multiple network addresses may be collectively represented in the association data to be mapped into one common preference. Generation of the association data may be asynchronous or independent of service requests from devices assigned with the network addresses, which may be balanced via server selections specified in the association data.

For example, a domain name server may query the association data to direct a client device of a network address to one of the available servers for a service (e.g. accessing a web page) based on the network address assigned to the client device. The size of the association data may be reduced via collective representation of multiple client network addresses to allow loading of the association data to a runtime memory of the domain name server for efficient query and processing.

The processing logic of process 500 can send the association data to a domain name server without exposing confidential or sensitive information on how client network addresses are mapped to server selection preferences. The association data can be queried using a client network address to identify the corresponding or mapped server selection preference in the domain name server, for example, to provide name resolution service. The association data may include mappings between client identifiers (e.g. including network addresses and run-time attributes) and server selection preferences.

In one embodiment, a collective representation in the association data can allow a query to determine whether a particular network address belongs to a plurality of network addresses of this collective representation efficiently without a need to enumerate through the plurality of network addresses. For example, the collective representation may correspond to a value range and the query can be performed based on determining whether the particular network address is represented by a value within the value range. Alternatively or optionally, the collective representation may include a pattern representing the plurality of the network addresses. Whether a network address belongs to the plurality of network addresses may be determined based on a simple pattern matching between a representation of a network address and the pattern.

In some embodiments, the association data may include a relationship database having multiple rows. Each row can represent a mapping of one or more client network addresses to one selection preference. A collective representation of multiple client network addresses mapped to a common preference may be represented by a single row in the relational database. The number of the rows in the relational database may depend on the number of the available servers but independent of the number of assignable client network addresses.

FIG. 6 is a flow diagram illustrating one embodiment of a process to perform a name resolution service using a pre-built server selection map for global load balancing. Exemplary process 600 may be performed by a processing logic, including, for example, some components of system 100 of FIG. 1. At block 601, the processing logic of process 600 can load an association data into a memory at a domain name server. The association data may include information specifying how to select one of a set of domain server addresses to provide a service of a domain name for a name resolution request from a client device with a client identifier. In some embodiments, the association data may be loaded to replace a previous version of the association data in the domain name server.

In one embodiment, each preference may indicate an ordered choice of one or more of the domain server addresses. The association data may include multiple associations, each association mapping one or more of the client identifiers to one of the preferences. The association data may include a database populated with the mapping or association information.

The processing logic of process 600 can receive a name resolution request for the domain name from a client device of a client identifier (e.g. specified in the request). In response, at block 603, the processing logic of process 600 can query (or lookup) the association data (e.g. in memory) for an association matching the client identifier. For example, the query may include a network address and optionally one or more run-time attribute values. The association can map the particular client identifier to a particular preference for domain server selection.

In some embodiments, the client device may provide (or be identified) with additional run-time information via the query. The run-time information may be detected via, for example, a software plugin installed in a DNS server, such as DNS server 109 of FIG. 1. The run-time information may include device type (e.g. "IPhone®", "IPad®", or other applicable device types), recent device locations, or other applicable device and/or time related information. These run-time information may represent a portion of attributes associated with the network address assigned to the client device. Actual attribute values of the run-time information for a network address may not be available until when receiving an actual client request. For example, run-time information such as device time of a device assigned with a specific network address may not be know until when a request is received from this device with, for example, identifiers identifying the attribute values of the run-time information.

At block 605, the processing logic of process 600 can send the particular preference obtained from the association data to the client device to resolve the domain name. The particular preference can include name resolution answers (e.g. server IP addresses) for the client device to receive the service of the named domain. The processing logic of process 600 may not need to send redirection requests to the client device for additional name resolution attempts of this name resolution request.

Figure 7:
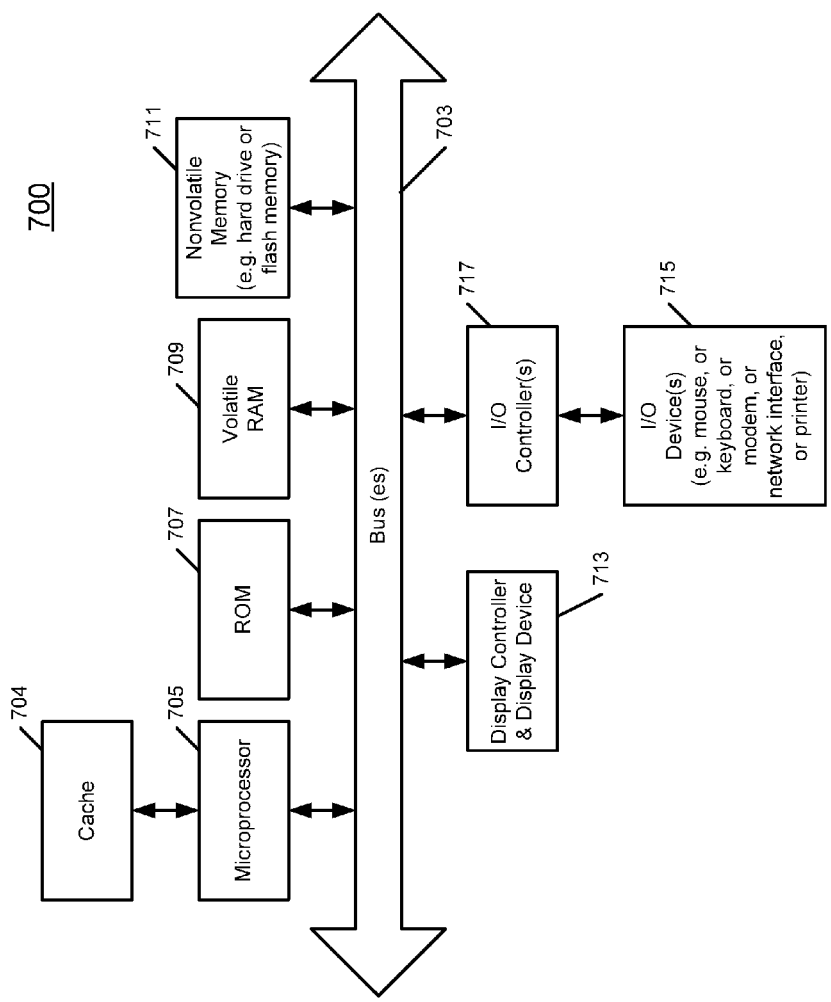
FIG. 7 illustrates one example of a data processing system such as a computer system, which may be used in conjunction with the embodiments described herein.

FIG. 7 shows one example of a data processing system, such as a computer system, which may be used with one embodiment the present invention. For example, system 200 of FIG. 2 may be implemented as a part of the system shown in FIG. 7. Note that while FIG. 7 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 7, the computer system 700, which is a form of a data processing system, includes a bus 703 which is coupled to a microprocessor(s) 705 and a ROM (Read Only Memory) 707 and volatile RAM 709 and a non-volatile memory 711. The microprocessor 705 may retrieve the instructions from the memories 707, 709, 711 and execute the instructions to perform operations described above. The bus 703 interconnects these various components together and also interconnects these components 705, 707, 709, and 711 to a display controller and display device 713 and to peripheral devices such as input/output (I/O) devices which may be mice, keyboards, modems, network interfaces, printers and other devices which are well known in the art. Typically, the input/output devices 715 are coupled to the system through input/output controllers 717. The volatile RAM (Random Access Memory) 709 is typically implemented as dynamic RAM (DRAM) which requires power continually in order to refresh or maintain the data in the memory.

The mass storage 711 is typically a magnetic hard drive or a magnetic optical drive or an optical drive or a DVD RAM or a flash memory or other types of memory systems which maintain data (e.g. large amounts of data) even after power is removed from the system. Typically, the mass storage 711 will also be a random access memory although this is not required. While FIG. 7 shows that the mass storage 711 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface or wireless networking interface. The bus 703 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A machine-readable non-transitory storage medium having instructions therein, which when executed by one or more machines, cause the one or more machines to perform a method, the method comprising:
    maintaining attributes for each of a set of network addresses assignable to a device capable of accessing a service via a domain name, wherein a set of servers with different server addresses are provided for the service of the domain name;
    determining a mapping relationship between the network addresses and a set of preferences among the servers based on the attributes, the mapping relationship specifying one or more of the preferences for each of the network addresses, wherein a plurality of the network addresses share a common one of the preferences in the mapping relationship; and
    generating an association data representing the mapping relationship, wherein the plurality of the network addresses are collectively represented in the association data to be associated with the common preference, the device subsequently requesting the service via one of the servers selected according to a preference in the association data identified by one of the set of network addresses assigned to the device, and wherein the request for the service from the device is directed to the selected server in real time asynchronous to the generation of the association data.

2. The medium of claim 1, wherein the request for the service from the device is directed to the selected server via a domain name server, wherein the identified preference is identified in the domain name server using the association data and wherein the association data is pre-computed prior to the request for the service.

3. The medium of claim 2, wherein the domain name server includes a memory device and wherein the association data is loaded within the memory device and wherein the association data is a data structure in the form of a lookup table.

4. The medium of claim 2, further comprising:
sending the association data to the domain name server, wherein the identified preference is identified via query for the domain name against the association data using the one of the set of network addresses assigned to the device.

5. The medium of claim 1, wherein a policy including rules and conditions is configured for distributing service loads among the set of servers, wherein each server is associated with server properties and wherein the determination comprises:
evaluating the attributes with the server properties according to the rules and conditions of the policy.

6. The medium of claim 5, wherein the identified preference includes addresses in an ordered list indicating one or more of the servers and wherein the selected server is selected from the ordered list in the device for the request of the service.

7. The medium of claim 5, wherein the attributes identify a client location for a corresponding network address, wherein the server properties include a server location, and wherein the evaluation comprises:
comparing distances of the client location to server locations of the set of servers, wherein at least one preference for each network address is specified according to degrees of proximities according to the distances to allow balanced loads of the servers for the service.

8. The medium of claim 7, wherein the client location and the server locations indicate separate geological locations and wherein the distances are based on differences of the geological locations.

9. The medium of claim 7, wherein the attributes includes a network service provider of the corresponding network address, the service of the domain having a domain network infrastructure, the network service provider having a provider network infrastructure, the client location located within the provider network infrastructure, the server locations located within the domain network infrastructure, wherein the distances are based on differences of the network locations.

10. The medium of claim 9, wherein the distances are measured in time unit indicating an amount of network connection latency.

11. The medium of claim 5, wherein the mapping relationship is determined repetitively based on a schedule, wherein the schedule indicates when changes of the policy occur.

12. The medium of claim 11, wherein the attributes of each network address are provided via one or more provider sources, and wherein the maintenance comprises:
refreshing attributes of at least one of the network addresses from the provider sources, wherein the attributes of the at least one network address are refreshed less frequently than the schedule.

13. The medium of claim 1, wherein whether a particular network address belongs to the plurality of network addresses can be determined based on the collective representation in the association data without enumerating the plurality of network addresses.

14. The medium of claim 13, wherein the collective representation include a value range and wherein the particular network address belongs to the plurality of network addresses if the particular network address is represented by a value within the value range.

15. The medium of claim 13, wherein the collective representation is associated with a particular pattern in representing the plurality of the network addresses, and wherein the particular network address belongs to the plurality of network addresses if a representation of the particular network address matches the particular pattern.

16. The medium of claim 13, wherein the association data includes a relationship database having multiple rows, each row representing a mapping of one or more of the network addresses to one of the preferences, and wherein the collective representation is associated with a particular one of the rows for the common preference.

17. The medium of claim 16, wherein number of the rows depends on number of the set of servers, the number of the rows independent of a number of devices assignable to the network addresses.

18. The medium of claim 1, wherein the attributes include run-time attributes and wherein the mapping relationship specifies no more than one of the preferences for each network address and associated run-time attributes and wherein the association data includes the run-time attributes.

19. A machine-readable non-transitory storage medium having instructions therein, which when executed by one or more machines, cause the one or more machines to perform a method, the method comprising:
loading, at a domain name server, an association data into a memory of the server, the association data mapping each of a set of client identifiers to one of a set of preferences for a set of domain server addresses to provide a service of a domain name, each preference indicating an ordered choice of one or more of the domain server addresses, wherein the association data includes multiple associations, each association mapping one or more of the client identifiers to one of the preferences;
in response to receiving a name resolution request for the domain name from a client identified by a particular client identifier, querying the association data for a particular association matching the client identifier, wherein the particular association maps the particular client identifier to a particular one of the preferences; and
sending the particular one preference to the client, the client subsequently requesting the service of the domain name via one or more of the domain server addresses specified in the particular one preference, wherein the association data is pre-computed, based on a plurality of attributes, prior to receiving the name resolution request.

20. The medium of claim 19, wherein the client identifier includes a network address assigned to the client.

21. The medium of claim 19, wherein the client identifier include run-time attributes associated with the client.

22. The medium of claim 19, wherein the association data is loaded repetitively according to a schedule independent of the receiving of the name resolution request.

23. A computer implemented method comprising:
maintaining, by one or more processors, attributes for each of a set of network addresses assignable to a device capable of accessing a service via a domain name, wherein a set of servers with different server addresses are provided for the service of the domain name;
determining a mapping relationship between the network addresses and a set of preferences among the servers based on the attributes, the mapping relationship specifying one or more of the preferences for each of the network addresses, wherein a plurality of the network addresses share a common one of the preferences in the mapping relationships; and generating an association data representing the mapping relationships, wherein the plurality of the network addresses are collectively represented in the association data to be associated with the common preference, the device subsequently requesting the service via one of the servers selected according to a preference in the association data identified by one of the set of network addresses assigned to the device, and wherein the request for the service from the device is directed to the selected server in real time asynchronous to the generation of the association data.

24. A computer system comprising:

one or more memories storing instructions; and one or more processors coupled to the one or more memories to execute the instructions from the one or more memories, the one or more processors being configured to maintain attributes for each of a set of network addresses assignable to a device capable of accessing a service via a domain name, wherein a set of servers with different server addresses are provided for the service of the domain name, determine a mapping relationship between the network addresses and a set of preferences among the servers based on the attributes, the mapping relationship specifying one or more of the preferences for each of the network addresses, wherein a plurality of the network addresses share a common one of the preferences in the mapping relationships, and generate an association data representing the mapping relationships, wherein the plurality of the network addresses are collectively represented in the association data to be associated with the common preference, the device subsequently requesting the service via one of the servers selected according to a preference identified in the association data by one of the set of network addresses assigned to the device, and wherein the request for the service from the device is directed to the selected server in real time asynchronous to the generation of the association data.

\* \* \* \* \*